United States Patent
Legallais et al.

(10) Patent No.: US 11,893,679 B2
(45) Date of Patent: Feb. 6, 2024

(54) METHODS FOR TRANSMITTING AND RENDERING A 3D SCENE, METHOD FOR GENERATING PATCHES, AND CORRESPONDING DEVICES AND COMPUTER PROGRAMS

(71) Applicant: INTERDIGITAL VC HOLDINGS, INC., Wilmington, DE (US)

(72) Inventors: Yvon Legallais, Rennes (FR); Charline Taibi, Cesson-Sevigne (FR); Serge Travert, Dinan (FR); Charles Salmon-Legagneur, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 22 days.

(21) Appl. No.: 17/625,574

(22) PCT Filed: Jul. 15, 2020

(86) PCT No.: PCT/US2020/042193
§ 371 (c)(1),
(2) Date: Jan. 7, 2022

(87) PCT Pub. No.: WO2021/011695
PCT Pub. Date: Jan. 21, 2021

(65) Prior Publication Data
US 2022/0284661 A1     Sep. 8, 2022

(30) Foreign Application Priority Data

Jul. 15, 2019  (EP) ..................... 19305939

(51) Int. Cl.
*G06T 15/20*     (2011.01)
(52) U.S. Cl.
CPC ................... *G06T 15/20* (2013.01)

(58) Field of Classification Search
None
See application file for complete search history.

(56) References Cited

U.S. PATENT DOCUMENTS

2015/0215497 A1* 7/2015 Zhang ............... H04N 21/6336
348/521

FOREIGN PATENT DOCUMENTS

EP     3432581     1/2019
EP     3457688     3/2019
(Continued)

OTHER PUBLICATIONS

Technicolor-Intel, "Description of Technicolor Intel response to MPEG-I 3DoF+ Call for Proposal," ISO/IEC JTC1/SC29/WG11 MPEG2019/m47445 (Mar. 2019).

*Primary Examiner* — Frank S Chen
(74) *Attorney, Agent, or Firm* — Volpe Koenig

(57) ABSTRACT

The disclosure discloses methods and devices for transmitting and rendering a 3D scene. The method for transmitting comprises: segmenting a space into m angular sectors, the m angular sectors each corresponding to an angular distance from a viewport, and the space into n depth ranges; obtaining (11) at least one first patch, generated from a first view of the 3D scene, said at least one first patch comprising a texture component and a depth component; obtaining (12) at least one atlas, generated from at least one second view of the 3D scene, said at least one atlas being built by packing together at least one second patch generated for at least one point of one of said second view that is not visible in another view of the 3D scene and that belongs to a same angular sector among the m angular sectors, and a same depth range among the n depth ranges, at least one of morn being greater than or equal to 2, said at least one second patch comprising a texture component and a depth component, wherein each of the at least one first patch and the at least one second patch (Continued)

is based on at least one of a sector and a depth; generating (13) a first subset of streams comprising m' pairs of streams and a second subset of streams comprising m'×n' pairs of streams; and transmitting (14) the first and second subsets of streams to the terminal.

18 Claims, 5 Drawing Sheets

(56) References Cited

FOREIGN PATENT DOCUMENTS

| | | |
|---|---|---|
| EP | 3489900 | 5/2019 |
| WO | 2017/146807 | 8/2017 |
| WO | 2019/055389 | 3/2019 |

* cited by examiner

METHODS FOR TRANSMITTING AND RENDERING A 3D SCENE, METHOD FOR GENERATING PATCHES, AND CORRESPONDING DEVICES AND COMPUTER PROGRAMS

CROSS-REFERENCE TO RELATED APPLICATIONS

This application is the U.S. National Stage, under 35 U.S.C. § 371, of International Application No. PCT/US2020/042193 filed Jul. 15, 2020, which claims the benefit of European patent application No. 19305939.1, filed Jul. 15, 2019, the contents of which are incorporated herein by reference.

TECHNICAL FIELD

The present disclosure relates to the field of video processing and more specifically to the field of volumetric video content. The present disclosure offers a technique for adaptive transmission of a representation of a 3D scene to a terminal, by considering at least one terminal-based delivery criterion. Such adaptive transmission can be used to enhance the rendering of the 3D scene, for example for an immersive rendering on terminals such as mobile or Head-Mounted Display devices (HMD).

The present disclosure may be adapted to any applications in which volumetric content, in particular 3DoF+ video content, has to be delivered.

BACKGROUND

This section is intended to introduce various aspects of art, which may be related to various aspects of the present disclosure that are described and/or claimed below. This discussion is helpful in providing background information to facilitate a better understanding of the various aspects of the present disclosure. Accordingly, it is understood that these statements are to be read in this light, and not as admissions of prior art.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a HMD device, 3DoF video may quickly become frustrating for the viewer who would expect more freedom, for example by experiencing parallax. In addition, 3DoF may also induce dizziness because of a user not only rotates his head but also translates his head in three directions, translations which are not reproduced in 3DoF video experiences.

Volumetric video (also known as 6 Degrees of Freedom (6DoF) video) is an alternative to 3DoF video. When watching a 6DoF video, in addition to rotations, the user can translate his head, and even his body, within the watched content and experience parallax and even volumes. Such videos considerably increase the feeling of immersion and the perception of the scene depth and also prevent dizziness by providing consistent visual feedback during head translations.

An intermediate approach between 3DoF and 6DoF, known as 3DoF+, has also been proposed. Such video based approach, for example disclosed in WO2019/055389, consists in transmitting volumetric input information as a combination of color and depth patches. Each patch results from successive spherical 2D projections/mappings of a subpart of the original 3D scene.

Basically, such a decomposition peels/factorizes the scene as: (1) a central patch containing the part of the scene visible from a main central viewpoint and (2) peripheral patches embedding the complementary information nonvisible from this central viewpoint.

In order to transmit 3DoF+ video content, the following two video frames are defined: (1) a color frame, that carries both the texture of the central patch and the texture of the peripheral patches to carry parallax information, and (2) a depth frame, that carries both the depth of the central patch and the depth of the peripheral patches to carry parallax information.

To limit the number of decoder contexts, the color and depth frames have fixed size, corresponding to the size of the central patch (4K pixels×2K pixels for instance) plus extra room size to carry parallax information from the source point of view, in all 360° directions.

However, wrapping parallax information into fixed-sized frames can be sufficient for simple scene without too many hidden objects, but can be inefficient for the transmission of complex scenes, where many hidden objects necessitate a large amount of data for peripheral video patches and parallax information. In addition, prior art 3DoF+ technique suffers from latency when rendering the 3D scene. This may be the case, for instance, when a HMD user turns head rapidly in one direction. According to prior art, the rendering terminal has to wait for the reception of the color frame before displaying anything, and wait for the reception of the depth frame for a volumetric rendering

SUMMARY

There is thus a need for a new technique for transmitting a 3D scene that overcomes at least one of the known techniques' drawbacks.

According to an aspect of the present disclosure, a method for transmitting a representation of a 3D scene to a terminal is disclosed. Such method comprises: segmenting a space into m angular sectors, the m angular sectors each corresponding to an angular distance from a viewport, and the space into n depth ranges; obtaining at least one first patch, generated from a first view of the 3D scene, said at least one first patch comprising a texture component and a depth component; obtaining at least one atlas, generated from at least one second view of the 3D scene, said at least one atlas being built by packing together at least one second patch generated for at least one point of one of said second view that is not visible in another view of the 3D scene and that belongs to a same angular sector among the m angular sectors, and a same depth range among the n depth ranges, at least one of m or n being greater than or equal to 2, said at least one second patch comprising a texture component and a depth component, wherein each of the at least one first patch and the at least one second patch is based on at least one of a sector and a depth; generating, according to at least one terminal-based delivery criterion: a first subset of streams comprising m' pairs of streams, from said first patch or patches, m' being a whole or a subset of the m angular sectors, and a second subset of streams comprising m'×n' pairs of streams, from said at least one atlas, with m'≤m and n'≤n, each pair of streams comprising a stream for transmitting the texture components and a stream for transmitting the depth components, and transmitting the first subset of streams and the second subset of streams to the terminal.

According to the present disclosure, it is thus possible to transmit only a subset of streams for transmitting the depth components and the texture components to the terminal, taking into account at least one terminal-based delivery criterion.

More specifically, for at least one second view, the points (or voxel) of the second view that are not visible in another view (first view or another second view) may be identified, and the depth range and/or the angular sector to which these points belong may be determined. The second patches obtained from these points, that can be used to transmit parallax information, may thus be grouped in atlases, with at least one atlas per depth range and/or per angular sector.

In this way, it is possible to transmit only the parallax information that is "useful" for the (user of the) terminal, instead of transmitting all the parallax information. For example, only the parallax information corresponding to the point of view of the user of the terminal may be transmitted, or only the parallax information corresponding to the smallest depth range from the point of view of the user may be transmitted, especially when the available bandwidth of the communication channel with the terminal is limited.

At least one embodiment of the disclosure thus aims at solving the problem of fixed-sized frames according to the prior art. Indeed, only the useful parallax information may be transmitted, thus addressing the problem of complex scene or the problem of heterogeneous scene, in which some sector of the 360° space are poor in parallax information, and other sectors have big amount of parallax information, that may not fit in the extra room size.

At least one embodiment of the disclosure also aims at solving the problem of latency in rendering. Indeed, only the useful parallax information can be transmitted, thus allowing fast rendering.

According to another embodiment, a corresponding device for transmitting a representation of a 3D scene to a terminal is disclosed. Such device may be especially adapted to implement the method for transmitting a representation of a 3D scene described here above. For example, such device is a server.

The present disclosure also discloses a method for rendering a 3D scene on a terminal. Such method comprises: segmenting a space into m angular sectors, the m angular sectors each corresponding to an angular distance from a viewport, and the space into n depth ranges; receiving a first subset of streams and a second subset of streams, generated according to at least one terminal-based delivery criterion, said first subset comprising m' pairs of streams generated from at least one first patch and said second subset comprising m'×n' pairs of streams generated from at least one atlas, each pair of streams comprising a stream for transmitting texture components and a stream for transmitting depth components, m' being a whole or a subset of the m angular sectors and n' being a whole or a subset of the n depth ranges, said at least one first patch being generated from a first view of the 3D scene and comprising a texture component and a depth component, said at least one atlas being generated from at least one second view of the 3D scene and being built by packing together at least one second patch generated for at least one point of one of said second view that is not visible in another view of the 3D scene and that belongs to a same angular sector among m angular sectors and a same depth range among n depth ranges, at least one of m or n being greater than or equal to 2, said at least one second patch comprising a texture component and a depth component, with m'≤m and n'≤n, wherein each of the at least one first patch and the at least one second patch is based on at least one of a sector and a depth; and building a representation of the 3D scene from the first subset of streams and the second subset of streams.

In particular, such method may be implemented for rendering a 3D scene transmitted through the method for transmitting a representation of a 3D scene as described above.

As already mentioned, as only "useful" parallax information may be received by the terminal, the method according to at least one embodiment allows fast rendering of the 3D scene.

According to another embodiment, a corresponding terminal for rendering a 3D scene is disclosed. Such terminal, also called device for rendering, may be especially adapted to implement the method for rendering a 3D scene described here above. For example, such device is a HMD, a mobile phone, a tablet, and so on.

The present disclosure also discloses a method for generating patches representing a 3D scene. Such method comprises: obtaining a first view of the 3D scene, from a first viewpoint; generating at least one first patch from said first view, said at least one first patch comprising a texture component and a depth component; obtaining at least one second view of the 3D scene, from at least one second viewpoint; and segmenting the 3D scene space into m angular sectors, the m angular sectors each corresponding to a distance from a given viewport, and into n depth ranges, wherein for at least one of said second view, the method further comprising: identifying at least one point of the second view that is not visible in another view of the 3D scene; determining a depth range to which said at least one point belongs; for at least one angular sector among the m angular sectors and for at least one depth range among n depth ranges, at least one of m or n being greater than or equal to 2, generating at least one second patch from said second view for the points belonging to said angular sector and said depth range, said at least one second patch comprising a texture component and a depth component, wherein each of the at least one first patch and the at least one second patch is based on at least one of a sector and a depth; and building at least one atlas by packing together at least one of the second patch generated for the points belonging to a same angular sector and a same depth range.

In particular, such method may be implemented for generating the patches and atlases that are obtained by the method for transmitting a representation of a 3D scene as described above.

According to a first embodiment, the method for generating patches and the method for transmitting a representation of a 3D scene may be implemented by the same device, for example a server.

According to a second embodiment, the method for generating patches and the method for transmitting a representation of a 3D scene may be implemented by two different devices that may communicate by wire or wireless, according to any communication protocol.

A corresponding device for generating patches representing a 3D scene according to the second embodiment is thus disclosed. Such device may be especially adapted to implement the method for generating patches representing a 3D scene described here above.

Another aspect of the disclosure pertains to at least one computer program product downloadable from a communication network and/or recorded on a medium readable by computer and/or executable by a processor comprising software code adapted to perform a method for transmitting a representation of a 3D scene, a method for rendering a 3D scene, or a method for generating patches representing a 3D scene, wherein the software code is adapted to perform at least one of the steps of the methods described above.

In addition, another aspect of the present disclosure relates to a non-transitory computer readable medium comprising a computer program product recorded thereon and capable of being run by a processor, including program code instructions for implementing the method for transmitting a representation of a 3D scene, a method for rendering a 3D scene, or a method for generating patches representing a 3D scene previously described

BRIEF DESCRIPTION OF THE DRAWINGS

The disclosure will be better understood and illustrated by means of the following embodiment and execution examples, in no way limitative, with reference to the appended figures in which.

Figure 1:
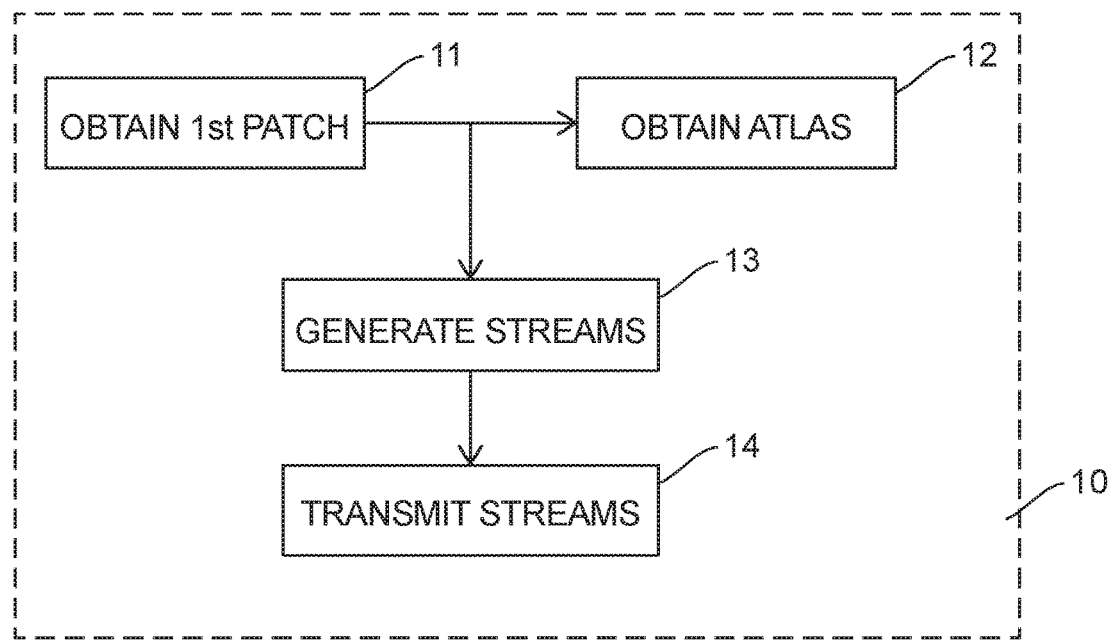
FIG. 1 is a flow chart illustrating a method for transmitting a representation of a 3D scene according to an embodiment of the disclosure.

In the Figures, the represented blocks are purely functional entities, which do not necessarily correspond to physically separate entities. Namely, they could be developed in the form of software, hardware, or be implemented in one or several integrated circuits, comprising one or more processors.

DETAILED DESCRIPTION

It is to be understood that the figures and descriptions of the present disclosure have been simplified to illustrate elements that are relevant for a clear understanding of the present disclosure, while eliminating, for purposes of clarity, many other elements found in typical transmitting or rendering devices.

The general principle of this disclosure will be discussed below.

The present disclosure proposes a technique for volumetric data organization and associated terminal-dependent delivery mode (for example viewport dependent).

According to at least one embodiment, such technique provides progressive rendering on a terminal, thus reducing latency by delivering first essential elements for an immediate volumetric rendering.

Such technique relies on a new method to construct the patches that contain the parallax information (volumetric data), allowing to construct patches depending on the point of view (of real or virtual cameras for example) and/or on the point position within the space (i.e. position of the point/voxel in the 3D scene, from the point of view): the furthest being the less important. The criteria to determine the priority of a volumetric data element (point position) may be the depth (distance from point of view), the angular sector (distance from the center of the delivered viewport) or a combination of both. For instance, the client may first download necessary video information for a basic flat 360° rendering and, according to available throughput, may further download improvement data for parallax experience.

According to at least one embodiment, volumetric data is thus organized in a list of video frames that can be of same size (e.g. 4K), but with different patch arrangements, allowing rendering per sector of 360° space, and per distance to the source point of view (e.g. close to far).

Volumetric data may consist in a variable list of patches, the content of which, for a given spatial sector, is distributed over a transmission of consecutive video frames.

To be able to switch from one point of view to another while optimizing the amount of received data, the volumetric content can be segmented in chunks of fix duration. On server side are stored chunks illustrating a three-level organization: per time interval, per sector, and per depth to the source point of view (i.e. level of detail). Thanks to this approach, the terminal (or client application) may retrieve data in a prioritized order: first necessary video information for flat 360° rendering and then, according to available throughput, improvement data for parallax experience. The priority for this data recovery may be proportional to the proximity of the user's position within the scene. It means that video patches and associated metadata corresponding to further objects may be used only if network resources are sufficient.

Figure 2:
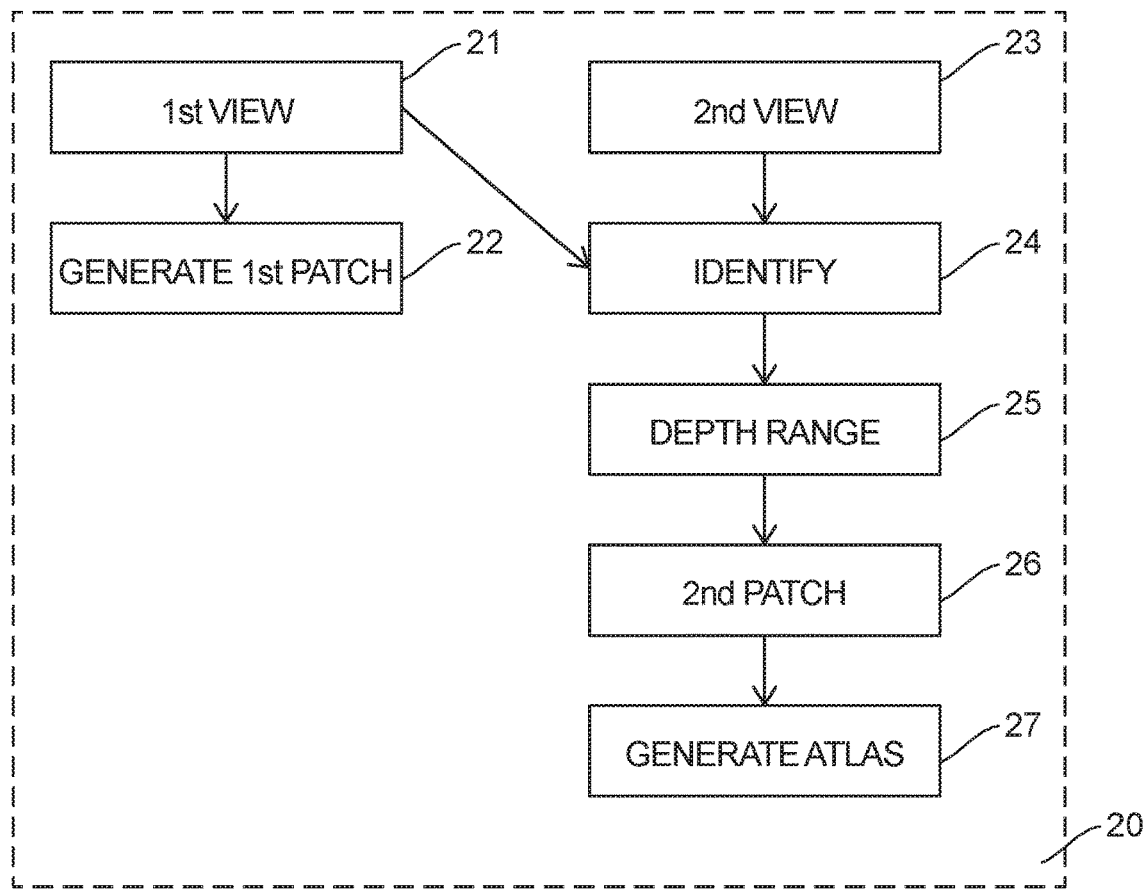
FIG. 2 is a flow chart illustrating a method for generating patches representing a 3D scene according to an embodiment of the disclosure.
Figure 3:
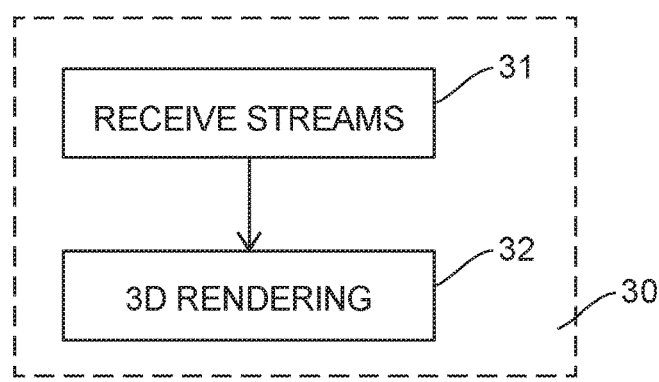
FIG. 3 is a flow chart illustrating the main steps of a method for processing a 3D scene according to an embodiment of the disclosure.

At least one embodiment of the disclosure is now presented in relation to FIGS. 1 to 3.

The main steps implemented by a device for transmitting a representation of a 3D scene, for example a server, are illustrated schematically in FIG. 1. According to this embodiment, the server (10) obtains (11) at least one first patch, comprising a texture component and a depth component. Such first patch or patches, also called main patch(es) or central patch(es), may be generated from a first view of the 3D scene captured from a first viewpoint (either by a real or virtual camera), also called main view or source view. It may be a projected representation of the 3D scene.

The server also obtains (12) at least one atlas. Such atlas or atlases may be generated from at least one second view of the 3D scene obtained from at least one second viewpoint (either by a real or virtual camera). More specifically, for one of the second views (and advantageously for each of the second views), at least one second patch, also called peripheral patch(es), may be generated. In order to reduce the amount of data that have to be transmitted, such second patch(es) may be generated only for the points of the second view that are not visible in the first view or in a second view captured from another viewpoint. Such second patch(es) can be packed or grouped together in atlas(es), taking into account the angular sector and/or the depth range to which the corresponding point belongs. In this way, several angular sectors centered on one of said viewpoints and/or several depth ranges originated from one of said viewpoints can be considered, and at least one atlas per angular sector and/or per depth can be built and obtained by the server. For example, a first depth range corresponds to a distance comprised between 0 and 50 cm from one of the viewpoint, a second depth range corresponds to a distance comprised between 50 cm and 1 m from one of the viewpoint, a third depth range corresponds to a distance comprised between 1 m and 2 m from one of the viewpoint, and a fourth depth range corresponds to distance greater than 2 m.

It can be noted that the steps for obtaining the first patch(es) and obtaining the atlas(es) may be implemented simultaneously or successively, in any order.

After obtaining the first patch(es) and atlas(es), the server may generate (13), depending on at least one terminal-based delivery criterion, the following streams: (1) a first subset of streams comprising m' pairs of streams, from said first patch or patches and (2) a second subset of streams comprising m'×n' pairs of streams, from said atlas or atlases, with m'≤m and n'≤n, each pair of streams comprising a stream for transmitting the texture components and a stream for transmitting the depth components.

For example, if the bandwidth of a communication channel between the server and the terminal is very large, there is no need to transmit only a subset of the streams: m' can be equal to m, and n' can be equal to n. On the contrary, if the bandwidth is limited, m' may be equal to 1, and n' may be equal to n, or m' may be equal to m, and n' may be equal to 1, or other combination.

The server may then transmit (14), or deliver, the first subset of streams and the second subset of streams to the terminal. The first patch(es) and the second patch(es) are thus transmitted in different frames.

For example, the terminal-based delivery criterion may be selected from a group comprising: a bandwidth available on a communication channel between the terminal and the server, at least one angular sector as viewed by a user of the terminal, capabilities of the terminal, and a request received from the terminal.

The generation of the streams and the transmission of the streams may be implemented periodically and/or after a change in said at least one terminal-based delivery criterion.

In this way, the generation of the streams to be transmitted to the terminal may be adapted to the terminal. In particular, it may change over the time, to adapt the content carried by the stream to the terminal, and for example to the point of view of the user of the terminal. The generation of the streams can be decided by the server, for example after analyzing the available bandwidth, or upon a request from the terminal.

According to at least one embodiment, the server obtains all the first patches generated from the first view, and all the atlases generated per angular sector and per depth range from all the second views of the 3D scene.

In this way, the server may have a complete knowledge of the 3D scene, and may generate only the streams that can be useful for the terminal, based on at least one terminal-delivery criterion. In particular, the server may generate a first set of streams comprising m pairs of streams, from all the first patches, and a second set of streams comprising m×n pairs of streams, from all the atlases, each pair of streams comprising a stream for transmitting the texture components and a stream for transmitting the depth components.

According to a first embodiment, the first and second patches, and corresponding atlases, may be generated by such server. In this first embodiment, the steps for obtaining (11) the first patch(es) and obtaining (12) the atlas(es) may correspond to steps for generating first patch(es) and generating the atlas(es).

According to a second embodiment, the first and second patches, and corresponding atlases, may be generated by another device for generating patches, and then transmitted to the server. In this second embodiment, the steps for obtaining (11) the first patch(es) and obtaining (12) the atlas(es) may correspond to steps for receiving the first patch(es) and receiving the atlas(es).

FIG. 2 illustrates the main steps for the generation of the first patch(es) and atlas(es) according to such second embodiment, implemented by a device for generating patches. According to this embodiment, such device (20) for generating patches may comprise a memory (not shown) associated with at least one processor configured to: obtain (21) a first view of the scene, from a first viewpoint; generate (22) at least one first patch from said first view, said at least one first patch comprising a texture component and a depth component; and obtain (23) at least one second view of the scene, from at least one second viewpoint. For the at least one second view of the scene (and advantageously for each second view), the at least one processor is further configured to: identify (24) at least one point of the second view that is not visible in another view of the 3D scene (first view or another second view); determine (25) a depth range to which said at least one point belongs, wherein for at least one angular sector among m angular sectors centered on one of said viewpoints, and for at least one depth range among n depth ranges originating from one of said viewpoints, at least one of m or n being greater than or equal to 2; generating (26), at least one second patch for the points belonging to said angular sector and said depth range, said at least one second patch comprising a texture component and a depth component; and build (27) at least one atlas by packing together at least one (and preferably all) second patch generated for points belonging to a same angular sector and a same depth range.

According to the first or the second embodiment, the first patch(es) may be generated by projecting the first view of the 3D scene on a 2D representation. For example, such 2D projection may be an EquiRectangular projection (ERP) or Cube Map projection such as proposed in the Omnidirectional MediA Format (OMAF) standard, currently in development by the Moving Picture Experts Group (MPEG). Other 3D to 2D projected representation may also be used. For more complex projections, a rectangle in projected picture could possibly be mapped to a 3D area more complex than an angular sector, but a one-to-one correspondence between tile and sub-part of point cloud may be advantageously ensured.

According to at least one embodiment, description data describing the organization of the first subset of streams and the second subset of streams may also be transmitted from the server to the terminal. Such description data can be transmitted in a manifest file, prior to the transmission of the first subset of streams and the second subset of streams. It may be transmitted offline, in response to a request from the terminal, on a dedicated channel, or previously stored in the terminal, downloaded from the server at the first use of the disclosure, and so on.

For example, said description data may comprise: (1) the number of available depth ranges and their values, (2) the number of available angular sectors and their positions, (3) a resolution of the atlas or atlases for each stream of the second subset, and if atlases are packed together in a GOP, (4) an average bit rate for each GOP and for each stream of the second subset of streams. The description data may also comprise the position of the patches within the 3D scene, expressed for example in spherical coordinates. The description data may be used by the terminal to select and to decode the streams and to render the 3D scene.

The main steps implemented by a terminal for rendering a 3D scene are illustrated schematically in FIG. 3. According to this embodiment, the terminal (30) receives (31) a first subset of streams and a second subset of streams, generated according to at least one terminal-based delivery criterion.

For example, the terminal-based delivery criterion may be selected from a group comprising: a bandwidth available on a communication channel with a device for transmitting a representation of the 3D scene, at least one angular sector as viewed by a user of the terminal, capabilities of the terminal, and a request sent by the terminal.

Such subsets of streams can be generated by the server 10 illustrated in FIG. 1. For example, the terminal may send a request to the server in order to receive only the parallax information useful for the terminal. In variant, the server may analyze the terminal-based delivery criterion (for example the communication channel between the server and the terminal or the position/point of view of the user of the terminal), and select the streams that have to be transmitted. For example, the server may only deliver the patches that correspond to the user's field of view.

The first subset of streams may comprise m' pairs of streams generated from at least one first patch and the second subset of streams may comprise m'×n' pairs of streams generated from at least one atlas, each pair of streams comprising a stream for transmitting texture components and a stream for transmitting depth components. Said at least one first patch may be generated from a first view of the 3D scene. Said at least one atlas may be generated from at least one second view of the 3D scene and may be built by packing together at least one second patch generated for at least one point of one of said second view that is not visible in another view of the 3D scene and that belongs to a same angular sector among m angular sectors and a same depth range among n depth ranges, with m'≤m and n'≤n, and at least one of m or n being greater than or equal to 2. Said at least one first patch and said at least one second patch may each comprise a texture component and a depth component.

The terminal may then build (32) and render a representation of the 3D scene from the first and second subsets of streams.

According to at least one embodiment, the second subset of streams may comprise at least the atlas built for the smallest depth range originating from a point of view of the user of the terminal.

According to at least one embodiment, the second subset of streams may comprise at least the atlas built for the angular sector centered on a point of view of the user of the terminal.

According to these embodiments, the point of view of the terminal (or of the user of the terminal) may be firstly determined, either by the terminal, by the server, or by another device. If it is determined by the terminal, the terminal may send a request to the server in order to obtain a second subset of streams taking into account said point of view.

The way of producing parallax patches according to at least one embodiment of the disclosure thus may allow a scalable delivery of volumetric video and consequently allow to cover a larger audience or to improve the experience for the same transmission cost.

According to at least one embodiment, it may allow transmitting the same 3DoF+ content on heterogeneous networks with different bandwidth capacities, as each terminal may adapt the quantity of parallax information retrieved from a server according to its network characteristics.

According to at least one embodiment, it may also aim at providing a fast first rendering on device (low latency), by implementing a progressive rendering, and displaying parallax information by order of importance and reception.

Detailed description of the embodiments of this disclosure will be described below.

First, several embodiments of the disclosure in the context of 3DoF+ will be discussed.

Generating patches according to prior art is now briefly discussed. In order to explain the differences between the prior art and the disclosure, reminders on the 3DoF+ technique for generating patches according to prior art are presented below.

As mentioned in the prior art section, 3DoF+ has been developed to enrich immersive video experience with parallax. The volumetric input information (for example volumetric video) may be decomposed in the following several components: color/depth in the form of a projected representation of the 360° scene as viewed from a central point, also called first or central patch; color/depth patches for parts of the scene revealed by a head natural displacement, also called second or peripheral patches; metadata containing information for exploiting patches.

Figure 4:
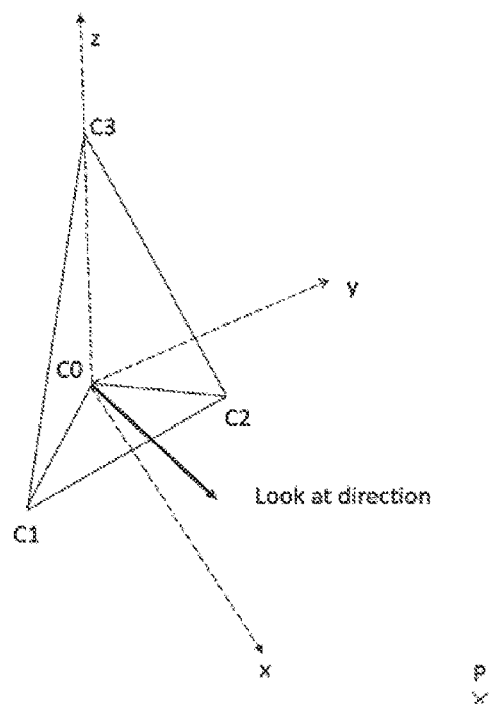
FIG. 4 illustrates the position of the cameras for generating patches according to the prior art.

Basically, the components of a volumetric video may be generated by: capture of a 360° scene, for example by a rig of N 360° cameras; point cloud generation from the N camera captures; introduction of four virtual cameras, three cameras being placed at the three vertices of a tetrahedron co-centered with a central viewing point where the camera C0 is, as illustrated in FIG. 4; generation of a projected representation with texture and depth, with the scene as seen from the central camera (camera C0 on the FIG. 4), forming two video streams C0 (Color) and D0 (Depth), wherein such projected representation may be obtained by any 3D to 2D projection, for example EquiRectangular Projection (ERP) or Cube Map projection (CMP); peeling process to generate color/depth patches for points which are not seen by the previous cameras, wherein this process may be done in an iterative manner, for each camera placed on a vertex (cameras C1, C2 and C3 on the FIG. 4); packing in a rectangular patch atlas the central and peripheral color/depth patches generated at previous steps, wherein the packing algorithm provides a patch position over a GOP and the metadata is being generated accordingly; encoding of the atlases, making use of legacy HEVC video codecs, wherein the depth and color atlases may first be respectively feathered and quantized in a dedicated manner to be robust enough to coding artifacts and to optimize the overall bitrate.

Figure 5:
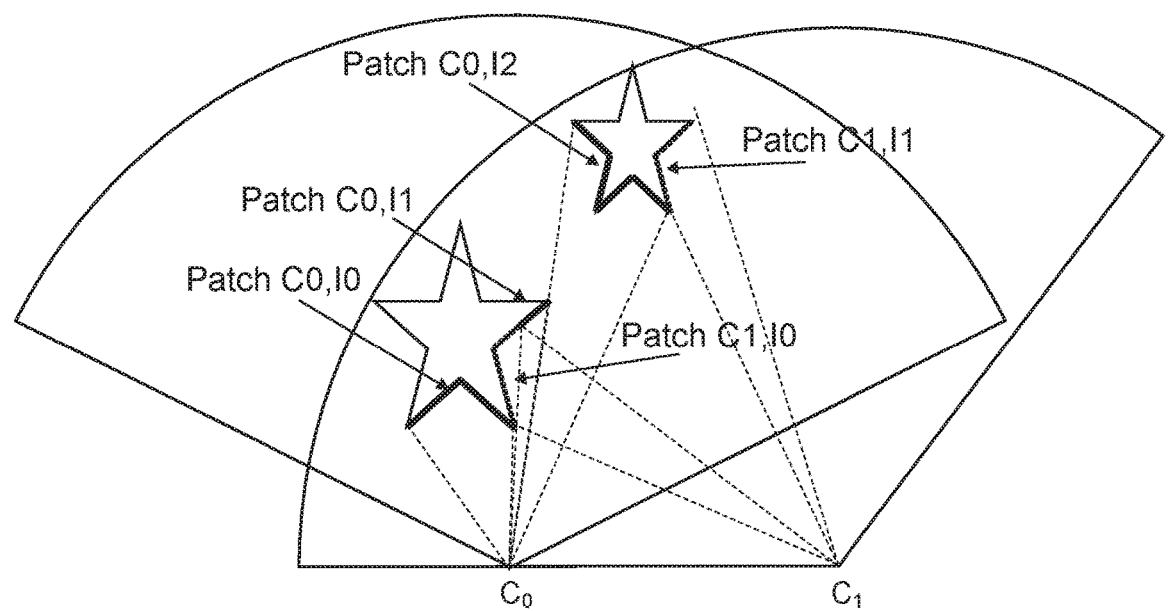
FIG. 5 gives an example of patches generated according to the prior art peeling technique.

As illustrated in FIG. 5, the points captured by camera C0 may be placed in first patches C0.I0, C0.I1 and C0.I2 where they are gathered by neighboring. A patch may be thus defined by a set of neighboring points. It may be split according to size criteria.

The peeling process may then deliver the peripheral patches. As illustrated in FIG. 5, the points captured by camera C1 which have not been seen by camera C0 are placed in second patches C1.I0, C1.I1 where they are gathered by neighboring. Such process can be implemented iteratively, for each camera C1, C2 and C3.

A dedicated packing algorithm may then place the patches in color and depth atlases in a GOP consistent way (patch position invariant over a GOP/IntraPeriod). The atlases may then be encoded making use of legacy HEVC video codecs. For each patch, a set of additional metadata may be provided specifying the information required to recover the volumetric scene (position/size of the patch, parameters of the projection). The overall stream is thus fully video-based and compatible with the existing video streaming pipelines.

Generating patches according to the disclosure will be described below.

According to the disclosure, a new algorithm for generating patches by viewpoint, depending on an angular sector of the central point of view and/or on the distance from the central point of view of this angular sector, is proposed. The technique aims at differentiating the points according to their positions. Globally, the furthest points may require less precision in texture or depth.

More specifically, the components of a volumetric video can be generated as disclosed in the previous section, but also by taking into account the depth range and/or the angular sector to which the point of the cloud of points belong.

According to a first example, the capture from the central camera (C0), delivering a first view (reference 21 in FIG. 2), is not modified from prior art. It still provides a projected representation of the 3D scene, for example an equirectangular representation, with color and depth (reference 22 in FIG. 2).

According to a second example, the capture from the central camera (C0) may be modified from prior art. For example, first patches are defined according to the range of depth or angular sector to which they belong.

Second patches are built by capturing points from various cameras (e.g., C1, C2 and/or C3 may deliver second view(s)) (reference 23 in FIG. 2), in order to reveal points which were masked by a previous capture (reference 24 in FIG. 2). It should be noted that the cameras C0 to C3 according to the disclosure may either be real cameras or virtual cameras, or a combination thereof. In addition, the number of cameras is not limited to four cameras, as disclosed in the prior art.

According to the disclosure, second patches may be defined by the range of depth or angular sector to which they belong, instead of (or in addition to) being defined by neighboring of points. The depth here may be either the distance from the central viewport (i.e. the position of C0) or the distance from the capture point (i.e. the position of C1, C2 or C3). The second approach regarding the capture point is more relevant since the depth determined from a capture point may be equivalent to the depth as seen by the user visualizing the volumetric content. In the same way, the angular sector may be centered either on the central viewport or on any of the capture points.

Figure 6A:
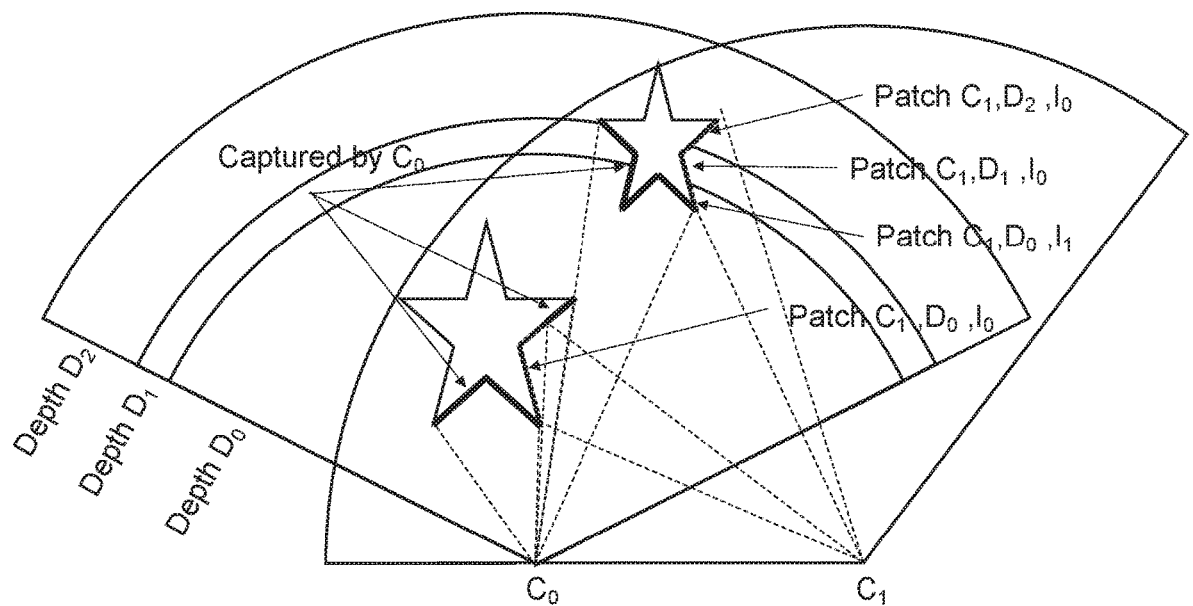
FIGS. 6A and 6B give examples of patches generated according to the disclosure.
Figure 6B:
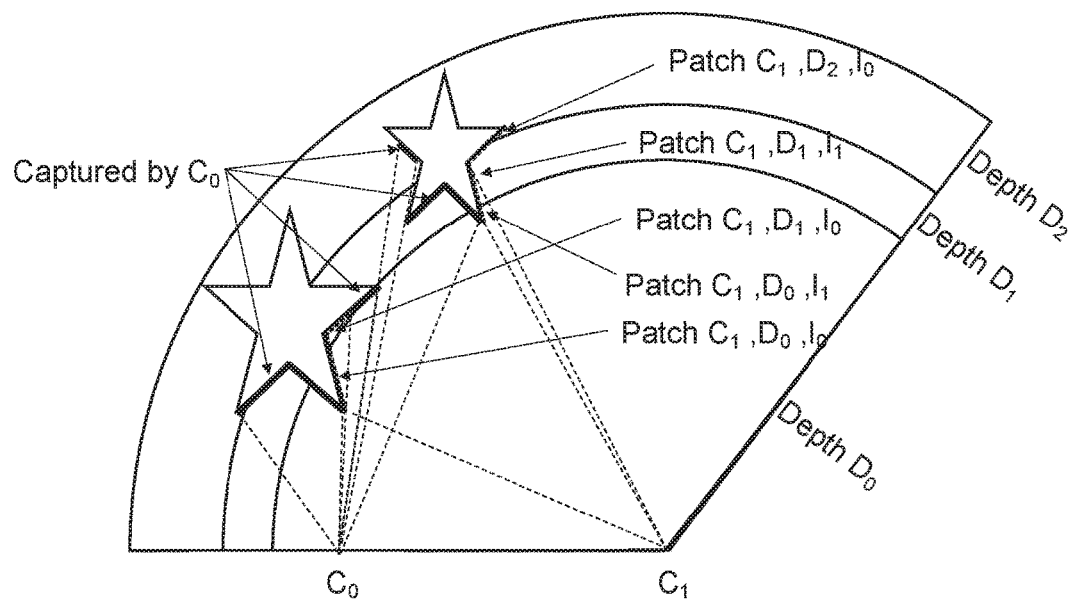

FIGS. 6A and 6B illustrate two examples of the generation of the second patches, taking into account the depth of the points, thus allowing an adaptive usage of the patches according to the depth of points they represent. When building the patches, this distance is taken into account. All points of a patch must belong to the same depth range. This allows to build patches which depend on the depth from an observation point, and consequently to be able to select them accordingly for an optimal delivery.

According to a first example illustrated in FIG. 6A, the space is divided in three areas $D_0$, $D_1$, $D_2$ corresponding to three different depth ranges (also called ranges of distance) from the central camera $C_0$.

Two patches $C_1.D_0.I_0$, $C_1.D_0.I_1$ and one patch $C_1.D_1.I_0$ and one patch $C_1.D_2.I_0$ are thus generated according to the disclosure ($C_i$ represents the corresponding camera, $D_j$ represents the corresponding depth range, and $I_k$ represents the index of the patch within the considered depth range), whereas only one patch C1.I0 and one patch C1.I1 were generated according to the prior art illustrated in FIG. 5.

According to a second example illustrated in FIG. 6B, the space is divided in three areas $D_0$, $D_1$, $D_2$ corresponding to three different depth ranges (also called ranges of distance) from the capture camera $C_1$.

In this case, five patches $C_1.D_0.I_0$, $C_1.D_0.I_1$ and $C_1.D_1.I_0$, $C_1.D_1.I_1$ and $C_1.D_2.I_0$ are generated according to the disclosure ($C_i$ represents the corresponding camera, $D_i$ represents the corresponding depth range, and $I_k$ represents the index of the patch within the considered depth range), whereas only one patch C1.I0 and one patch C1.I1 were generated according to the prior art illustrated in FIG. 5.

The five patches $C_1.D_0.I_0$, $C_1.D_0.I_1$ and $C_1.D_1.I_1$ and $C_1.D_2.I_0$ may thus be generated according to the disclosure if the second patches are defined by grouping neighboring points according to the range of depth to which they belong. In variant, three patches $C_1.D_0$, $C_1.D_1$ and $C_1.D_2$ can be generated if the second patches are not defined by neighboring of points, but according to the range of depth or angular sector to which they belong.

Of course, the number and the size of the depth ranges are not limited to the ones illustrated in FIGS. 6A and 6B.

Once the patches are built, they may be wrapped into atlases with other patches of same depth range (even if the depth is from another point of observation).

Once all the patches/atlases are generated per depth and/or per sector, they are stored in a memory of the device for generating patches, for later use.

When the available throughput is not sufficient for delivering all the content, this kind of patching per depth range and/or per angular sector according to the disclosure may allow to privilege closest volumetric data or viewport-based volumetric data.

For example, when the farthest patches are not delivered, an inpainting technique may limit the effects of missing parts of the scene. The available throughput being dedicated to closest objects, it optimizes the rendering.

Before playing the content, the player/device for rendering can instantiate and configure a fix number of video decoders without having to reconfigure it during consumption even if the amount of data within atlases may vary over time.

The following description will discuss the delivery of patches.

According to the disclosure, a new algorithm for delivering the patches, i.e. transmitting a representation of the 3D scene, is also proposed.

Such transmission is adaptive, and depends on at least one terminal-based delivery criterion. According to at least one embodiment, such patch delivery algorithm aims at optimizing user experience according to available network and terminal resources.

In other words, the device for transmitting a representation of the 3D scene may select some patches/atlases to be transmitted, among all the patches/atlases previously generated by the device for generating patches and stored. As already mentioned, the device for generating patches and the device for transmitting a representation of the 3D scene may be one and the same device, for example a server.

Different approaches for an adaptive volumetric content delivery with an objective of optimizing bit rate and player resources are disclosed below.

The following description will first discuss depth-based delivery of patches.

According to a first example, the texture and depth components of the projected representation of the 3D scene (first patches) may be entirely delivered from the device for transmitting a representation of the 3D scene (for example server 10) to the device for rendering the 3D scene (for example terminal 30).

If the first patches were generated per sector and/or per depth in the device for generating patches, they may all be transmitted to the server 10, and the server 10 may concatenate or merge the first patches in order to cover one angular sector of 360°.

In the same way, if the second patches were generated per sector and/or per depth in the device for generating patches, they may all be transmitted to the server 10, and the server 10 may concatenate or merge the second patches in order to cover one angular sector of 360°.

In this depth-based approach, the content may be organized in $2+(n\times2)$ streams as follows: a first set of streams comprising one pair of streams, to transport respectively the texture components and the depth components of the first patch(es), a second set of streams comprising n pairs of streams, to transport respectively the texture components and the depth components of the n atlas(es) generated for the second patches associated to n levels of depth range and metadata associated to the atlas(es).

For example, the first set of streams may carry one central patch of size W×H, where W and H may depend on the visual quality defined by the number of pixels per degrees (PPD). For example a 4K×2K frame offers a 4K/360°=11 pixels per degrees quality.

The atlases may be put together in the form of group of pictures (GOP). The duration of the GOP may be the same for all the streams while not always containing the frame number.

One manifest can describe the organization of the different streams.

For example, the manifest indicates: the number n of available depth ranges and their values, for each stream associated to a depth range d=1 . . . n, the resolution $W_d \times H_d$ of the atlas carried by the stream, and for each stream associated to a depth range d=1 . . . n, for each GOP index t, the average bit rate $Rate_{t,d}$.

The value of the resolution $W_d \times H_d$ of the atlas may be defined, for example: as being at least equal to the average number of points (i.e. pixels) per second patch for the depth range d; or as being at least equal to the maximal number of points (i.e. pixels) per second patch for the depth range d.

In the latter case, there may be exactly one atlas frame per rendered video frame.

As already mentioned, the manifest may be transmitted off line, at the beginning of the content distribution (in the same or a dedicated channel) or via any suitable manner, like an explicit request by the client (terminal) to the server.

The server may transmit the first set of streams (comprising one pair of streams) and the second set of streams (comprising n pairs of streams) to the terminal, if there is no bandwidth limitation.

In variant, knowing, for each depth range d, the necessary bandwidth $Rate_{t,d}$, the terminal can select a first subset of streams and a second subset of streams. For example, as above discussed that the projected representation of the 3D scene (first patches) may be entirely delivered to the terminal, the first subset of streams may be identical to the first set of streams. The second subset of streams comprises n' pairs of streams, with n'≤n, the number of atlas streams to be downloaded being selected according to at least one terminal based criterion, such as the available bandwidth or the terminal capabilities.

The streams corresponding to the closest depth may be downloaded in priority.

The rendering may be decoupled from the complete reception of all streams, and may start as soon as the first atlas stream is completed. This may allow progressive rendering on the fly. First level of details, brought by the first atlas stream (for d=1) is first rendered at the lowest latency, and progressively completed by the reception of pending next streams (for d=2 . . . n').

Figure 7:
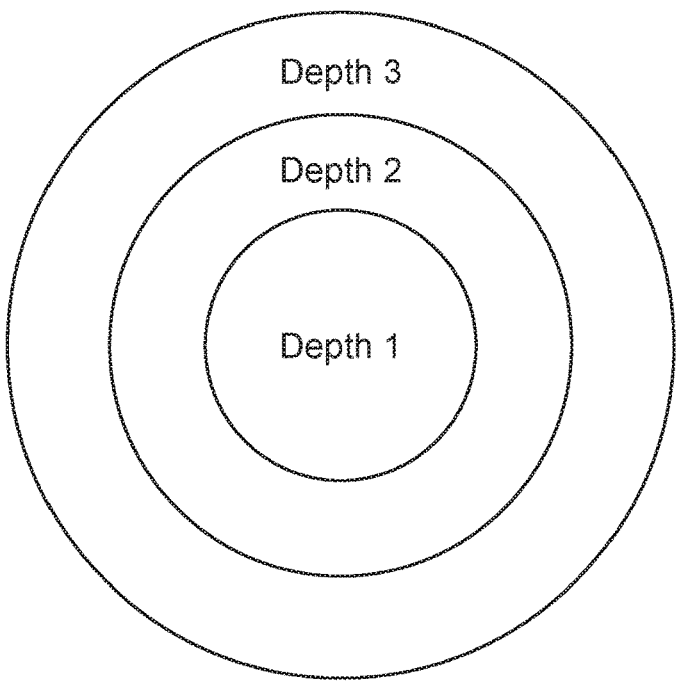
FIG. 7 illustrates an example of depth prioritization representation.

Without sectorization (i.e. with one angular sector of 360°), the priority of the patches retrieved by the rendering device may be the index of depth, with the smallest index corresponding to the shortest distance from the viewpoint, as illustrated in FIG. 7.

According to at least one embodiment, the number of available depth ranges n may vary over time for a same content. For instance, it may be reduced to one for the majority of time (for example by merging the atlases generated for the different depth range at the server side) and may be increased for a period of time when the scene becomes more complex. In that case, the adaptive behavior of the player may allow it to select only most essential depth atlases according to its available bandwidth.

The following description will first discuss viewport-based delivery of patches.

According to a second example, the texture and depth components of the projected representation of the 3D scene (first patches) may be delivered partially, in a viewport based way, from the device for transmitting a representation of the 3D scene (for example server 10) to the device for rendering the 3D scene (for example terminal 30).

Indeed, volumetric content may require a large amount of data to be delivered and consequently, this is not always compliant with existing networks where bandwidth can be limited. Therefore, such a content is often partially delivered in a viewport based way.

For example, high quality content (e.g. 8K 3DoF+ content or more for the full scene representation) may be tiled in m angular sectors ($[\Theta i1, \theta i2]$ for the longitude, $[\varphi i1, \varphi i2]$ for the latitude), centered either on the central viewport (i.e. the position of C0) or on any of the capture point (i.e. the position C1, C2 and C3). The second approach regarding the capture point is more relevant since the angular sector as viewed from a capture point may be equivalent to the angular sector as seen by the user visualizing the volumetric content.

For each sector, a set of streams to carry volumetric data corresponding to this scene sub part are disclosed.

In this viewport-based approach, the content may be organized in $(2+n\times2)\times m$ streams as follows: a first set comprising m pair of streams, to transport respectively the texture components and the depth components of the first patch(es), for the m sectors, a second set comprising m×n pairs of streams to transport respectively the texture components and the depth components of the n atlas(es) generated for the second patches associated to n levels of depth range, for the m sectors, and metadata associated to the atlas(es).

The server may transmit the first set of streams (comprising m pairs of streams) and the second set of streams (comprising m×n pairs of streams) to the terminal, if there is no bandwidth limitation. In this case, if the available bandwidth is sufficient to deliver all the scene to the player, the depth-based delivery is actually a viewport based delivery with m=1 (e.g. only one sector).

In variant, the client may select a first subset of m' pairs of streams and a second subset of m'×n' pair of streams, with m'≤m and n'≤n, the number of streams to be downloaded being selected according to at least one terminal based criterion, such as the available bandwidth or the terminal capabilities.

On the rendering device, for each interval of time (GOP), the next viewport and the sector that covers this next viewport may be predicted. The terminal may thus download from the server only streams related to that part for the next GOP duration. This operation may be repeated every GOP.

In another embodiment, for an over-provisioning purpose, the terminal may download, in addition to the streams related to the next predicted viewport, supplementary streams to cover neighboring of the predicted viewport.

Figure 8:
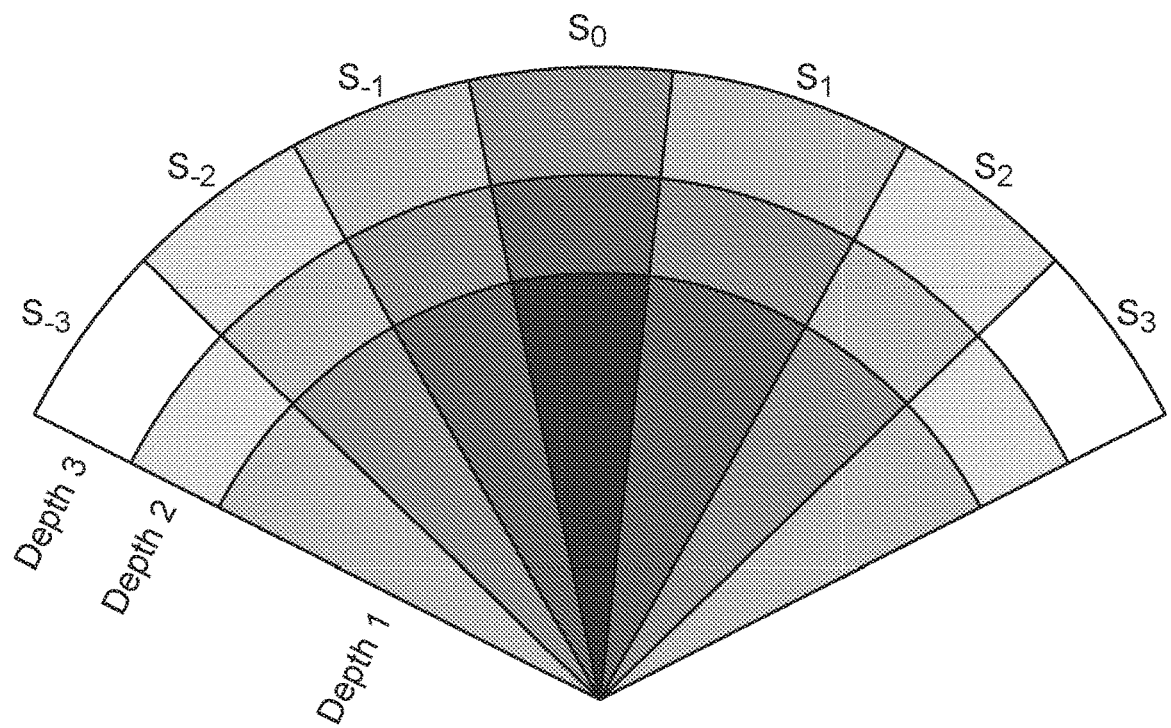
FIG. 8 illustrates an example of sector and depth prioritization representation.

According to at least one embodiment, the atlases may be defined by depth and angular sector. In that case, the priority of atlases may be defined according to two parameters: depth from user's position and angle with users gaze direction. FIG. 8 illustrates the priority of atlases to be retrieved by a player according to the location of points they represent. As illustrated in FIG. 8, atlases obtained for the smallest index of depth (Depth 1) and angular sector corresponding to the point of view of the user (S0) may be retrieved first. Then atlases obtained for a directly higher index of depth (Depth 2) and angular sector corresponding to the point of view of the user (S0) may be retrieved, as well as atlases for the smallest index of depth (Depth 1) and angular sector adjacent to the angular sector corresponding to the point of view of the user (S1, S−1), and so on.

Of course, the number and the size of the depth ranges and angular sectors are not limited to the ones illustrated in FIG. 8. In particular, the size of the depth ranges, respectively of the angular sectors, can be different depth range by depth range, respectively sector by sector.

Like for the depth-based delivery approach, one manifest may describe the organization of different streams. In order to take benefit of sectorization and provide patch positions to the client, the manifest may also comprise the patches position within the 3D scene expressed for example in spherical coordinates. Since a patch may represent a volume and not a point (it has a texture component and a depth component), its position may be represented either as single coordinate indicating a central point of the patch (barycenter for instance) or as a set of spherical coordinates $(r, \theta, \varphi)$/size $(dr, r \sin \varphi \, d\theta, rd\varphi)$ of a volume element containing the patch.

It should finally be noted that both depth-based delivery of patches approach and viewport-based delivery of patches approach may be combined.

The following description will discuss devices.

Figure 9:
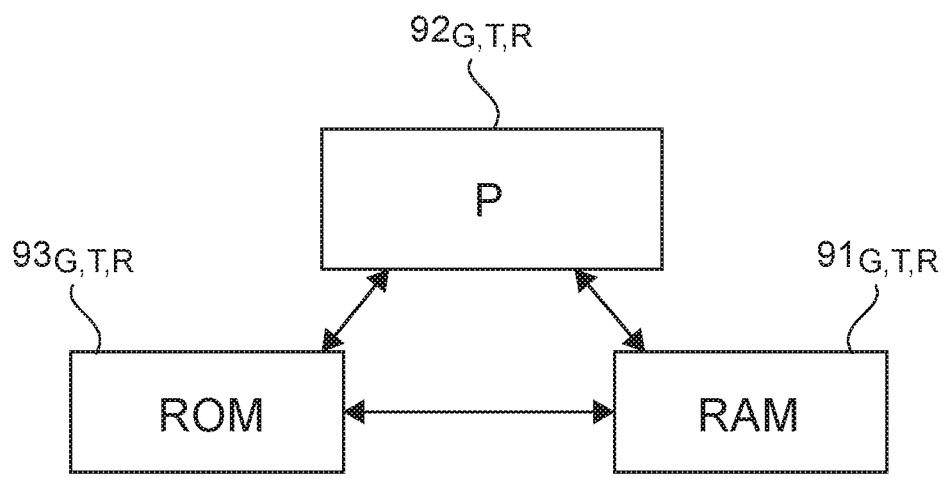
FIG. 9 is a block diagram of a device implementing at least one of the methods for generating patches representing a 3D scene, the method for transmitting a representation of a 3D scene, or the method for rendering a 3D scene according to at least one embodiment of the disclosure.

FIG. 9 schematically illustrates an example of a device for generating patches representing a 3D scene, a device for transmitting a representation of a 3D scene, or a device for rendering a 3D scene according to at least one embodiment of the disclosure.

The device for generating patches representing a 3D scene may comprise for example a non-volatile memory 93G (e.g. a read-only memory (ROM) or a hard disk), a volatile memory 91G (e.g. a random access memory or RAM) and at least one processor 92G. The non-volatile memory 93G may a non-transitory computer-readable carrier medium. It may store executable program code instructions, which are executed by the processor 92G in order to enable implementation of the method described above in its various embodiments.

In particular, the processor 92G is configured to perform the following processes: obtain a first view of the 3D scene, from a first viewpoint; generate at least one first patch from said first view, said at least one first patch comprising a texture component and a depth component; and obtain at least one second view of the 3D scene, from at least one second viewpoint. For at least one of said second view, the processor 92G is further configured to perform the following processes: identify at least one point of the second view that is not visible in another view of the 3D scene; determine a depth range to which said at least one point belongs; for at least one angular sector among m angular sectors and for at least one depth range among n depth ranges, at least one of m or n being greater than or equal to 2, generate at least one second patch from said second view for the points belonging to said angular sector and said depth range, said at least one second patch comprising a texture component and a depth component; and build at least one atlas by packing together at least one of the second patch generated for the points belonging to a same angular sector and a same depth range.

Upon initialization, the aforementioned program code instructions may be transferred from the non-volatile memory 93G to the volatile memory 91G so as to be executed by the processor 92G. The volatile memory 91G likewise may include registers for storing the variables and parameters required for this execution.

The device for transmitting a representation of a 3D scene may comprise for example a non-volatile memory 93T (e.g. a read-only memory (ROM) or a hard disk), a volatile memory 91T (e.g. a random access memory or RAM) and at least one processor 92T. The non-volatile memory 93T may be a non-transitory computer-readable carrier medium. It may store executable program code instructions, which are executed by the processor 92T in order to enable implementation of the method described above in its various embodiments.

In particular, the processor 92T may be configured to perform the following processes: obtain at least one first patch, generated from a first view of the 3D scene, said at least one first patch comprising a texture component and a depth component; obtain at least one atlas, generated from at least one second view of the 3D scene, said at least one atlas being built by packing together at least one second patch generated for at least one point of one of said second view that is not visible in another view of the 3D scene and that belongs to a same angular sector among m angular sectors and a same depth range among n depth ranges, at least one of m or n being greater than or equal to 2, said at least one second patch comprising a texture component and a depth component; generate a first subset of m' pairs of streams from said first patch or patches and a second subset of m'×n' pairs of streams from said atlas or atlases, with m'≤m and n'≤n, according to at least one terminal-based delivery criterion, each pair of streams comprising a stream for transmitting the texture components and a stream for transmitting the depth components, and transmit the first subset of streams and the second subset of streams to the terminal.

Upon initialization, the aforementioned program code instructions may be transferred from the non-volatile memory 93T to the volatile memory 91T so as to be executed by the processor 92T. The volatile memory 91T likewise may include registers for storing the variables and parameters required for this execution.

The device for rendering a 3D scene may comprise for example a non-volatile memory 93R (e.g. a read-only memory (ROM) or a hard disk), a volatile memory 91R (e.g. a random access memory or RAM) and at least one processor 92R. The non-volatile memory 93R may be a non-transitory computer-readable carrier medium. It may store executable program code instructions, which are executed by the processor 92R in order to enable implementation of the method described above in its various embodiments.

In particular, the processor 92R may be configured to receive a first subset of streams and a second subset of streams, generated according to at least one terminal-based delivery criterion, said first subset comprising m' pairs of streams generated from at least one first patch and said second subset comprising m'×n' pairs of streams generated from at least one atlas, each pair of streams comprising a stream for transmitting texture components and a stream for transmitting depth components, said at least one first patch being generated from a first view of the 3D scene and comprising a texture component and a depth component, said at least one atlas being generated from at least one second view of the 3D scene and being built by packing together at least one second patch generated for at least one point of one of said second view that is not visible in another view of the 3D scene and that belongs to a same angular sector among m angular sectors and a same depth range among n depth ranges, at least one of m or n being greater than or equal to 2, said at least one second patch comprising a texture component and a depth component, with m'≤m and n'≤n. The processor 92R may be further configured to build a representation of the 3D scene from the first subset of streams and the second subset of streams.

Upon initialization, the aforementioned program code instructions may be transferred from the non-volatile memory 93R to the volatile memory 91R so as to be executed by the processor 92R. The volatile memory 91R likewise may include registers for storing the variables and parameters required for this execution.

The methods according to at least one embodiment of the disclosure may be implemented equally well through one of the following ways: (1) by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or (2) by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination

What is claimed is:

1. A method for rendering a 3D scene on a terminal, the method comprising:
   receiving, at the terminal, a manifest, wherein the manifest includes:
      a reference to at least one first data stream available from a server, the at least one first data stream comprising a central patch content of the 3D scene, the central patch content comprising parts of the scene visible from a central viewpoint;
      a reference to a plurality of second data streams available from the server, the plurality of second data streams comprising parallax patch content of the 3D scene, wherein the parallax patch content comprises parts of the 3D scene visible from a secondary non-central viewpoint; and
      an association of each of the second data streams to a range of depths;
   requesting, from the server, at least one available first data stream;
   requesting, from the server, a subset of available second data streams selected based at least on a range of depths associated with the at least one available second data stream; and
   rendering the 3D scene using the central patch content from the requested first data streams and parallax patch content from the requested selected subset of available second data streams.

2. The method of claim 1, further comprising:
   receiving at the terminal the requested first data streams and the requested subset of available second data streams.

3. The method of claim 1, further comprising:
   wherein the manifest further specifies an association of each of the second data streams to an angular sector.

4. The method of claim 3, wherein the associated angular sector comprises a range of angles within a view of a user of the terminal.

5. The method of claim 3, wherein the subset of the available second data streams is selected based on a range of depths and the angular sector associated with the available second data streams.

6. The method of claim 1, wherein the subset of the available second data streams is selected based on at least one of a bandwidth available on a communication channel between the terminal and the server, and a capability of the terminal.

7. The method of claim 1, wherein the subset of the available second data streams is selected based on a prioritization of depth ranges, with second data streams associated to closer depth ranges given a higher priority than second data streams associated to further depth ranges.

8. The method of claim 1, wherein the manifest additionally specifies an association of each of the second data streams to a time interval.

9. The method of claim 1, wherein the terminal is a head mounted display.

10. The method of claim 1, wherein the parallax patch content comprises depth patches and texture patches.

11. The method of claim 1, wherein each second data stream carries the parallax patch content in the form of an atlas of patches.

12. A method for generating a 3D scene at a server, the method comprising:
   transmitting a manifest, wherein the manifest includes;
      a reference to at least one first data stream, the at least one first data stream comprising a central patch content of the 3D scene, the central patch content comprising parts of the scene visible from a central viewpoint;
      a reference to a plurality of second data streams, the plurality of second data streams comprising parallax patch content of the 3D scene, wherein the parallax patch content comprises parts of the 3D scene visible from a secondary non-central viewpoint; and
      an association of each of the second data streams to a range of depths;
   receiving a request for at least one available first data stream;
   receiving a request for a subset of available second data streams selected based at least on a range of depths associated with the at least one available second data stream; and
   transmitting the at least one available first data stream and subset of available second data streams to enable rendering of a 3D scene.

13. The method of claim 12, further comprising: specifying, in the manifest, an association of each of the second data streams to an angular sector.

14. The method of claim 13, wherein the associated angular sector comprises a range of angles within a view of a user of a terminal.

15. The method of claim 12, wherein the manifest additionally specifies an association of each of the second data streams to a time interval.

16. The method of claim 12, wherein the parallax patch content comprises depth patches and texture patches.

17. The method of claim 12, wherein each second data stream carries the parallax patch content in the form of an atlas of patches.

18. A terminal comprising:
   a receiver;
   a transmitter; and
   a processor;
   wherein the receiver is configured to receive a manifest, wherein the manifest includes:
      a reference to at least one first data stream available from a server, the at least one first data stream comprising a central patch content of a 3D scene, the central patch content comprising parts of the 3D scene visible from a central viewpoint;
      a reference to a plurality of second data streams available from the server, the plurality of second data streams comprising parallax patch content of the 3D scene, wherein the parallax patch content comprises parts of the 3D scene visible from a secondary non-central viewpoint; and
      an association of each of the second data streams to a range of depths;
   wherein the transmitter is configured to request, from the server, at least one available first data stream;
   wherein the transmitter is further configured to request, from the server, a subset of available second data streams selected based at least on a range of depths associated with the at least one available second data stream; and
   wherein the processor is configured to render the 3D scene using the central patch content from the requested first data streams and parallax patch content from the requested selected subset of available second data streams.

* * * * *